(12) United States Patent
Shu et al.

(10) Patent No.: US 8,516,815 B2
(45) Date of Patent: Aug. 27, 2013

(54) TRANSIENT COMPRESSOR SURGE RESPONSE FOR A TURBOCHARGED ENGINE

(75) Inventors: Yong Shu, Northville, MI (US); Michiel J. Van Nieuwstadt, Ann Arbor, MI (US); Brien Lloyd Fulton, West Bloomfield, MI (US); Frank M. Korpics, Belleville, MI (US); Harold Huimin Sun, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/619,261

(22) Filed: Sep. 14, 2012

(65) Prior Publication Data

US 2013/0013168 A1 Jan. 10, 2013

Related U.S. Application Data

(62) Division of application No. 12/370,167, filed on Feb. 12, 2009, now Pat. No. 8,272,215.

(60) Provisional application No. 61/056,620, filed on May 28, 2008.

(51) Int. Cl.
*F02D 23/00* (2006.01)

(52) U.S. Cl.
USPC .......................................... 60/602; 60/605.1

(58) Field of Classification Search
CPC ...................................................... F02D 23/00
USPC ................................. 60/602, 600–603, 605.1
See application file for complete search history.

(56) References Cited

U.S. PATENT DOCUMENTS

| | | | |
|---|---|---|---|
| 5,605,044 A | 2/1997 | Zimmer et al. | |
| 6,010,303 A | 1/2000 | Feulner | |
| 6,059,522 A | 5/2000 | Gertz et al. | |
| 6,298,718 B1 | 10/2001 | Wang | |
| 6,327,856 B1 | 12/2001 | Iwabuchi et al. | |
| 6,378,306 B2 * | 4/2002 | Koelle et al. | 60/605.1 |
| 6,470,864 B2 | 10/2002 | Kim et al. | |
| 6,871,498 B1 * | 3/2005 | Allen et al. | 60/608 |
| 7,047,742 B2 | 5/2006 | Kono et al. | |
| 7,107,770 B2 | 9/2006 | Shirakawa | |
| 8,042,335 B2 * | 10/2011 | Pursifull et al. | 60/602 |
| 2002/0184951 A1 | 12/2002 | Bonanni | |

OTHER PUBLICATIONS

Partial Translation of Office Action of Chinese Application No. 200910142085.6, Issued Jun. 5, 2012, State Intellectual Property Office of PRC, 5 Pages.

* cited by examiner

*Primary Examiner* — Quyen Leung
*Assistant Examiner* — Michael Andrews
(74) *Attorney, Agent, or Firm* — Julia Voutyras; Alleman Hall McCoy Russell & Tuttle LLP

(57) ABSTRACT

A method for responding to an existing or incipient surge condition of a turbocharger coupled to an engine of a motor vehicle is provided. The method comprises receiving a signal responsive to an operating condition of the turbocharger and adjusting one or more operating parameters of the motor vehicle when a power of the signal, integrated over a pre-selected range of non-zero frequencies, exceeds a pre-selected threshold. Other embodiments provide related systems for responding to an existing or incipient surge condition of a turbocharger.

1 Claim, 4 Drawing Sheets

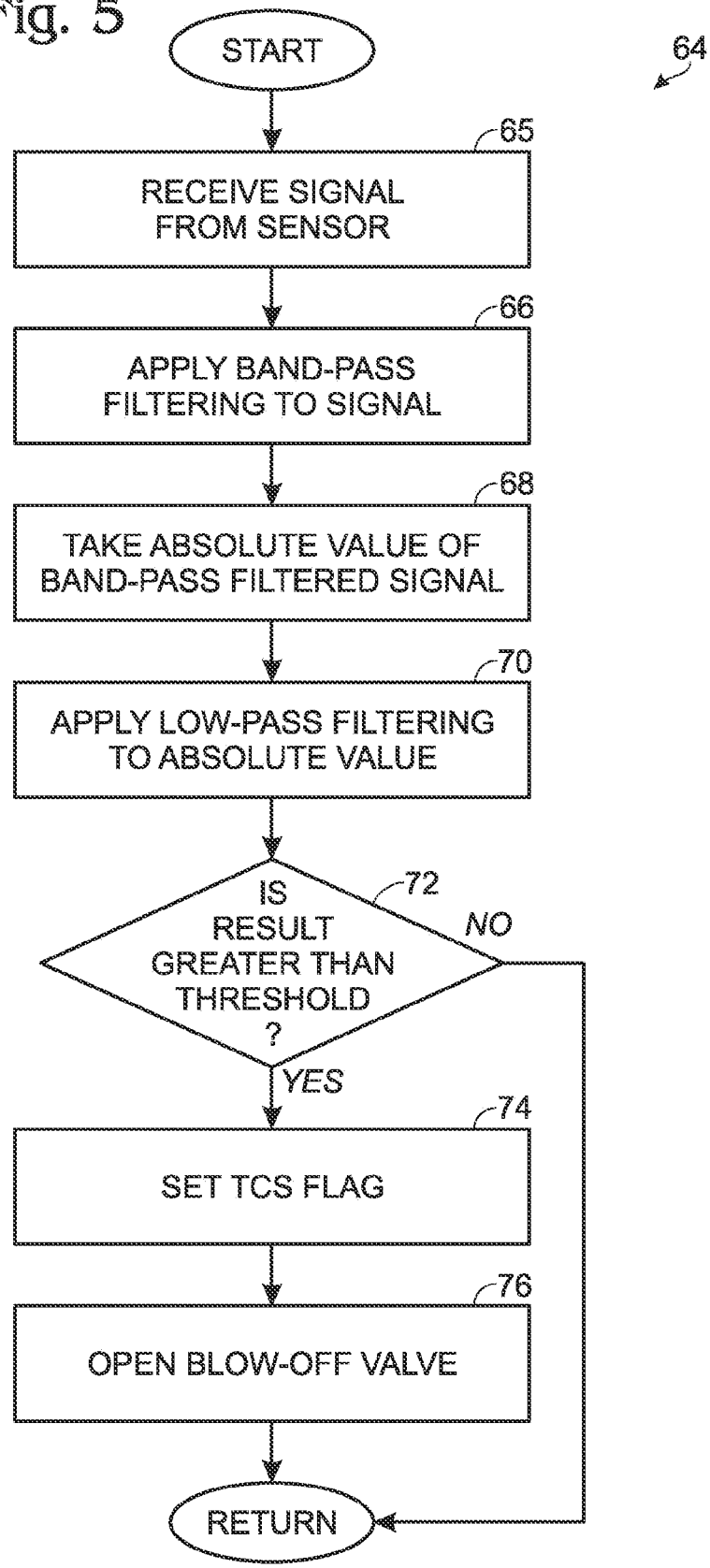

TRANSIENT COMPRESSOR SURGE RESPONSE FOR A TURBOCHARGED ENGINE

CROSS REFERENCE TO RELATED APPLICATION

This application is a divisional of U.S. application Ser. No. 12/370,167, filed Feb. 12, 2009, and entitled TRANSIENT COMPRESSOR SURGE RESPONSE FOR A TURBOCHARGED ENGINE, which claims the benefit of U.S. Provisional Application 61/056,620, filed on May 28, 2008, and entitled METHOD OF TRANSIENT COMPRESSOR SURGE DETECTION FOR A TURBOCHARGED INTERNAL COMBUSTION ENGINE, the entirety of each of which are hereby incorporated herein by reference for all purposes.

TECHNICAL FIELD

The present application relates to the field of internal combustion engines, and more particularly, to improving the reliability of turbocharged internal combustion engines of motor vehicles.

BACKGROUND AND SUMMARY

A turbocharger may be used to increase the power output of an internal combustion engine. The turbocharger does so by pressurizing the intake air, thereby increasing the mass of air provided to each of the engine's combustion chambers during the intake stroke. The increased air mass supports combustion of a correspondingly greater amount of fuel delivered to each combustion chamber, which provides increased power relative to a naturally aspirated engine of similar displacement. In a motor vehicle, a turbocharged engine may provide increased fuel economy by maintaining a higher power-to-weight ratio than a naturally aspirated engine of similar output and recovering internal energy from the exhaust to drive the turbocharger compressor. A turbocharger may be advantageously matched to an engine by creating an 'operating net,' defining appropriate pressure and flow conditions for the turbocharger compressor between surge and choked flow lines. Proper sizing of the operating net is required to meet the attributes of the engine: making the operating net too large may result in poor response and emissions characteristics, for example.

However, a turbocharger compressor coupled to an internal combustion engine may be subject to unwanted surge when a pressure ratio in the turbocharger compressor (viz., P, the ratio of the outlet pressure to the inlet pressure) is too great relative to the flow of air through the turbocharger compressor. Turbocharger compressor surge (TCS) is a dynamic instability mode that can generate air-flow and pressure oscillations of great amplitude; this condition may induce undesirable stresses in the turbocharger and the intake, including excessive torsional loading on the turbocharger shaft. Continued or excessive TCS may decrease the longevity of the turbocharger and/or the engine to which it is coupled. Further, TCS in a motor vehicle may adversely affect motorist satisfaction by causing undesirable vibration, noise and power loss. Turbocharged engine systems may therefore be configured to detect certain kinds of TCS and to take action to suppress TCS when it is detected.

For example, a turbocharged engine system may be configured to sense a pressure ratio P and a mass flow rate M of air into the engine intake, and to indicate TCS if the value of P lies outside an interval determined for the value of M. The converse is also possible—indicating TCS if the value of M lies outside an interval determined for the value of P. However, such approaches may not be the most suitable for all types of TCS.

The pressure-ratio and mass-flow rate intervals referenced above may be determined based on steady-state conditions of the engine, where engine speed and load are related predictably to each other. Under such conditions, calculations may be used to predict, for any value of M, the appropriate P interval below which TCS will not occur. But TCS may also occur during transient states of the engine, where speed and load are not related to pressure ratio and mass-flow rate as they are under steady-state conditions. Such transient states include, for example, tip-out, rich combustion (intake throttle closed relative to steady state), and exhaust-gas recirculation (intake throttle open relative to steady state). Under these conditions and others, methods of TCS detection based on steady-state P or M intervals may not appropriately detect TCS.

To address this issue, some engine systems use P or M intervals derived from steady-state calculations, but build in wide safety margins (e.g., 20%) to guard against transient TCS. This approach, however, may significantly limit turbocharger performance and may undermine the advantages of the turbocharged engine system.

The inventors herein have recognized the inadequacies of the existing methods outlined above and have provided various approaches directed to transient TCS response. In one embodiment, a method for responding to an existing or incipient surge condition of a turbocharger coupled to an engine of a motor vehicle is provided. The method comprises receiving a signal responsive to an operating condition of the turbocharger and adjusting one or more operating parameters of the motor vehicle when a power of the signal, integrated over a pre-selected range of non-zero frequencies, exceeds a pre-selected threshold. Other embodiments provide related systems for responding to an existing or incipient surge condition of a turbocharger. The systems and methods disclosed herein provide a reliable response to transient TCS whilst avoiding excessive constraints on turbocharger performance.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 5 illustrates an example method for indicating transient TCS in a turbocharged engine system, in accordance with the present disclosure.

DETAILED DESCRIPTION

Figure 1:
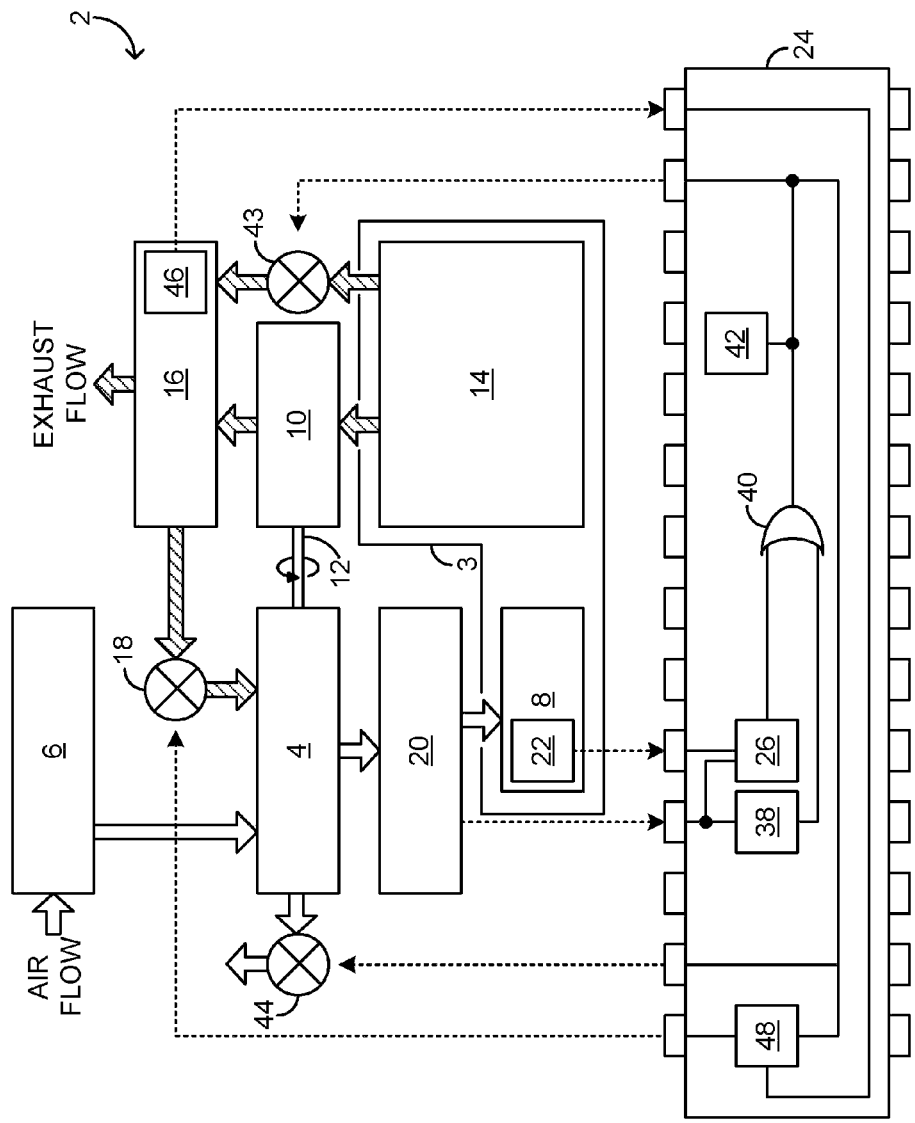
FIG. 1 shows in schematic detail an example turbocharged engine system, in accordance with the present disclosure.

FIG. 1 shows in schematic detail an example engine system 2 including and engine 3, which may be disposed in a motor vehicle. The engine system includes turbocharger compressor 4, which is configured to draw air from air cleaner 6 and to provide pressurized air to intake manifold 8. The turbocharger compressor is mechanically coupled to and driven by turbocharger turbine 10 via shaft 12. The turbocharger turbine derives mechanical power from hot engine exhaust conducted therethrough. Accordingly, turbocharger turbine 10 is configured to admit engine exhaust from exhaust manifold 14, and to route the engine exhaust (at a lower temperature and pressure) to exhaust passage 16.

Engine system 2 further includes exhaust-gas recirculation (EGR) valve 18, which is an electronically controllable valve configured to controllably admit engine exhaust from the exhaust passage to turbocharger compressor 4. Thus, the illustrated engine system embodies a so-called 'low-pressure EGR' strategy, wherein some exhaust may be recirculated from the exhaust (downstream of the turbocharger turbine) to the intake upstream of the turbocharger compressor. Other engine systems fully consistent with this disclosure may embody a so-called 'high-pressure EGR' strategy, wherein engine exhaust from an exhaust manifold (upstream of the turbocharger turbine) may be controllably admitted to an intake manifold downstream of a turbocharger compressor, also via a controllable EGR valve.

In the illustrated configuration, at least some of the pressurized air from the turbocharger compressor passes through mass flow sensor 20 en route to the engine. The mass flow sensor may be configured to provide an output (e.g., a voltage or current) responsive to the mass flow rate M of air from the turbocharger compressor to the intake of the engine. In some embodiments, the output of the mass-flow sensor may correspond to a mass-flow rate parameter, e.g., a normalized mass flow rate.

FIG. 1 also shows pressure sensor 22, which is coupled to intake manifold 8 and configured to provide an output (e.g., a voltage or current) responsive to the pressure ratio P. In the illustrated configuration, the output of mass flow sensor 20 and the output of pressure sensor 22 are both routed to electronic control unit 24. Electronic control unit 24 may be any electronic control unit of engine system 2 or of the motor vehicle in which the engine system is disposed. In some embodiments, the electronic control unit may be part of a more extensive electronic system, e.g., a diagnostic system of the motor vehicle. The electronic control unit may be configured to indicate when turbocharger compressor 4 is undergoing TCS based on the various sensor outputs provided thereto. The electronic control unit may be further configured to adjust one or more operating parameters of the motor vehicle to suppress TCS. In some embodiments, such operating parameters may include engine operating parameters: exhaust gas recirculation, fuel-injection amount, and throttle position, for example. In other embodiments, the operating parameters may include turbocharger operating parameters. Therefore, one or more control signals from the electronic control unit may be provided to engage or disengage the turbocharger compressor, to modulate the turbocharger boost and/or speed, to open or close a turbocharger waste gate or blow-off valve, to open or close an EGR valve, for example. Thus, electronic control unit 24 may be configured to indicate when the turbocharger is undergoing TCS and to provide a surge-suppressing control signal when TCS is indicated.

Further, the electronic control unit may comprise one or more subsystems (e.g., observers) configured to respond to particular variants of TCS. In FIG. 1, for example, electronic control unit 24 includes steady-state TCS observer 26. The steady-state TCS observer may be coupled to an output of mass flow sensor 20 and an output of pressure sensor 22. The steady-state TCS observer may be further configured to indicate whether the turbocharger compressor at the operating point (M, P) is susceptible to steady-state TCS, as further described below with the aid of FIG. 2. To this end, the steady-state TCS observer may comprise a set of electronic components configured to indicate the surge condition when an intake pressure of the engine exceeds a critical pressure based on a mass flow rate of air into the engine, or, when a mass flow rate of air into the engine is less than a critical mass flow rate based on an intake pressure of the engine, wherein one or more of the critical pressure and the critical mass flow rate are based on steady-state surge conditions of the turbocharger compressor.

Figure 2:
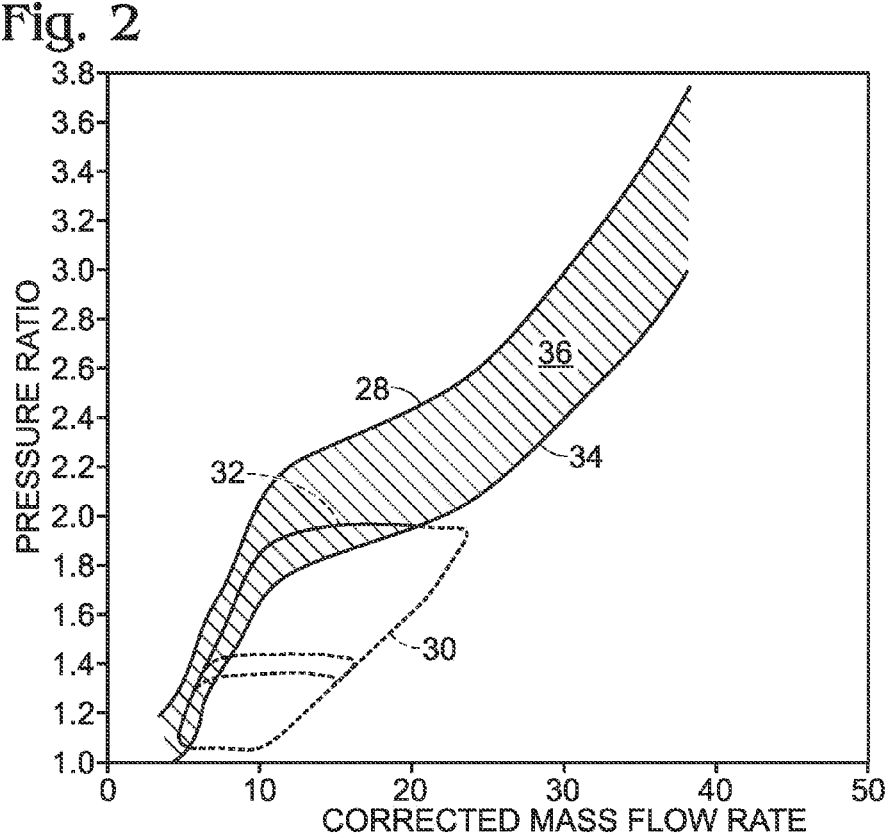
FIG. 2 shows a graph of pressure ratio versus corrected mass flow rate of air for various operating states of a hypothetical turbocharged engine, in accordance with the present disclosure.

FIG. 2 shows a graph of pressure ratio P versus corrected mass flow rate M for various operating states of a hypothetical turbocharged engine. The graph includes steady-state TCS boundary 28, which is a line below which TCS cannot occur under steady-state conditions. Above the line, i.e., at higher P or lower M, the turbocharger compressor may be susceptible to TCS. The steady-state TCS boundary may be theoretically derived, based on various properties of the turbocharger and the engine, or it may empirically derived, e.g., by operating the turbocharger and engine under steady state conditions, and establishing thresholds where steady-state TCS is likely to occur.

For any turbocharged engine system, steady-state TCS observer 26 may be configured to determine whether an observed operating point (M, P) of turbocharger compressor 4 lies above steady-state boundary 28. In doing so, the steady-state TCS observer may employ appropriate digital and/or analog electronics—digital to analog convertors, logic gates, microprocessors, look-up tables, operational amplifiers, analog mathematical processors, etc. In effect, the steady-state TCS observer may define an interval of allowable P for any observed value of M, and may indicate TCS when the observed P lies outside that interval. The converse is also contemplated; that is, the steady-state TCS observer may define an interval of allowable M for any observed P, and indicate TCS when the observed M lies outside that interval.

FIG. 2 also shows a locus of transient-state operating points 30, which may correspond to any series of transient operating states of the turbocharged engine. In the illustrated example, the locus of transient-state operating points corresponds to a tip-out condition. Even though the entire locus of transient state operating points lies below steady-state boundary 28, turbocharger compressor 4 exhibits TCS at some of the operating points. Specifically, transient-state TCS is indicated for points in subset 32 of the locus of transient-state operating points.

Transient TCS may be triggered by a sudden and substantial reduction in engine fueling rate and/or exhaust air flow rate. Under typical operating conditions, the intake pressure may decay much more slowly from an initial high value than the rate of reduction in turbocharger driving force. Transient TCS may occur when the accumulated pressure at the intake exceeds the compressor's ability to sustain positive air movement.

In order to define appropriate P or M intervals to detect and suppress such transient-state TCS in the manner described above, it would be necessary to use a boundary line lower than steady-state boundary 28. For example, transient-safe boundary 34 could be used to define appropriate P or M intervals below which even transient-state TCS is unlikely to occur. In FIG. 2, transient-safe boundary 34 is derived from steady-state boundary 28 by decreasing each pressure value by 20 percent.

It is apparent from the graph, however, that the transient-safe boundary approach as described above may significantly limit the operating range of the turbocharger compressor. Specifically, FIG. 2 shows wasted region 36, which lies between steady-state boundary 28 and transient-safe boundary 34. By using the transient-safe boundary to set allowed P or M intervals for the turbocharger compressor, the turbocharger compressor may not be permitted to operate in the wasted region, even under steady-state conditions. Thus, the performance advantage of the turbocharged engine is significantly reduced relative to its full potential.

Therefore, returning now to FIG. 1, electronic control unit 24 also includes transient TCS observer 38. In the illustrated configuration, steady-state TCS observer 26 and transient TCS observer 38 are independently configured to indicate TCS. In other embodiments, however, two or more TCS observers may be configured for various modes of interoperability. Through appropriate logic circuitry 40, an indicating signal from either observer may trigger adjustment of one or more operating parameters of the motor vehicle. For example, the indicating signal may invoke a TCS flag 42 in the electronic control unit or in a diagnostic system of the motor vehicle. The indicating signal may further provide a surge-suppressing control signal to the turbocharger.

The surge-suppressing control signal may suppress TCS in a number of different ways, depending on the particular configuration of the turbocharged engine system. In some embodiments, the surge-suppressing control signal may trigger a reduction in turbocharger boost and/or speed. In the illustrated embodiment, engine system 2 includes waste gate 43, configured to controllably cause some of the engine exhaust to by-pass turbocharger turbine 10, thereby providing less torque to the turbocharger compressor. The engine system also includes blow-off valve 44, configured to vent some of the compressed air from the turbocharger compressor away from the intake manifold—e.g., to atmosphere or back to the turbocharger compressor inlet. Thus, the surge-suppressing control signal may have the effect, via the controller 24, of opening the waste gate and/or the blow-off valve to reduce the turbocharger boost and/or speed.

In other embodiments, the surge-suppressing control signal may have the effect, via the controller 24, of adjusting exhaust-gas recirculation by at least partly opening or closing low pressure EGR valve 18. Alternatively or additionally, a high pressure EGR valve may be adjusted based on the surge-suppressing control signal.

More specifically, some operating conditions of the engine system may be such that TCS is suppressed by further opening the EGR valve, and other (different) operating conditions may be such that TCS is suppressed by further closing the EGR valve. Therefore, engine system 2 includes EGR flow sensor 46, which is coupled to exhaust passage 16. The EGR flow sensor may be any component responsive to the direction of EGR flow into or out of the exhaust passage. In the illustrated embodiment, an output of the EGR flow sensor is routed to EGR control module 48 of electronic control unit 24. The EGR control module may be configured to at least partly close EGR valve 18 in response to the surge-suppressing control signal when EGR flow sensor 46 indicates positive exhaust-gas recirculation flow. Further, the EGR control module may be configured to at least partly open EGR valve 18 in response to the surge-suppressing control signal when EGR flow sensor 46 indicates negative exhaust-gas recirculation flow.

Figure 3:
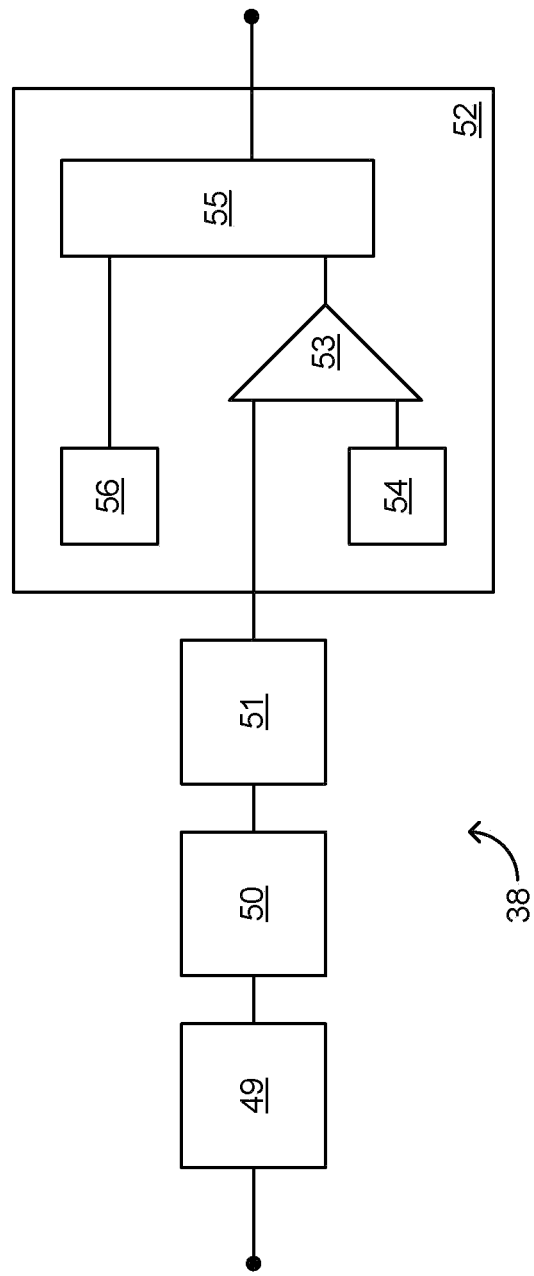
FIG. 3 shows an example transient TCS observer in schematic detail, in accordance with the present disclosure.

FIG. 3 shows an example transient TCS observer 38 in schematic detail. The transient TCS observer includes first and second frequency-selective modules, a power-responsive module, and a discriminating module. In the illustrated embodiment, the first frequency-selective module comprises band-pass filter 49. The band-pass filter is configured to receive an output from pressure sensor 22. The band-pass filter may be an analog filter having a fixed or adjustable lower pass-band edge frequency and a fixed or adjustable upper pass-band edge frequency. In one embodiment, the lower pass-band edge frequency of the band-pass filter may be 30 radians per second, and the upper pass-band edge frequency may be 80 radians per second. In particular, the band-pass filter may be a second-order Butterworth filter, a Chebyshev filter, or an elliptic filter, for example. While FIG. 3 shows band-pass filter 49 configured to receive an output from pressure sensor 22, the band-pass filter or other first frequency-selective module may instead be configured to receive an output from mass air flow sensor 20, for example, or otherwise configured to respond to one or more of an intake pressure of the engine and a mass flow rate of air into the engine.

Continuing in FIG. 3, the first frequency-selective module is configured to provide an output to a power-responsive module. The power-responsive module may be any module responsive to the power of the sensor output within a band of frequencies selected via the first frequency-selective module. In the illustrated embodiment, the power-responsive module comprises absolute-value convertor 50. The absolute-value convertor may be an analog circuit configured to accept a positive or negative input (e.g., voltage input) from the first frequency-selective module and to generate a corresponding positive output.

Continuing in FIG. 3, the power-responsive module is configured to provide an output to a second frequency-selective module. In the illustrated embodiment, the second frequency-selective module comprises low-pass filter 51. The low-pass filter may be an analog filter having a fixed or adjustable lower pass-band edge frequency. In one embodiment, the pass-band edge frequency of the low-pass filter may be 30 radians per second. In one particular embodiment, the band-pass filter may be a second-order Butterworth filter.

Continuing in FIG. 3, the second frequency-selective module is configured to provide an output to discriminating module 52. In the illustrated embodiment, the discriminating module comprises comparator 53, reference 54, adder 55, and increment 56. The comparator may be configured to compare the output of the second frequency-selective module to reference 54, which may be a fixed or adjustable voltage reference. In one embodiment, the comparator may be configured to change an output voltage state (negative to positive, for example) when the output of the second frequency-selective module exceeds the reference. The comparator is further configured to provide an output to adder 55. The adder is configured to add the output of the comparator to an increment 56, which may be fixed or adjustable voltage increment, for example. In one embodiment, the increment may be of approximately the same magnitude as the output voltage swing of comparator 53. Thus, the discriminating module may be configured to indicate the surge condition when an output of the second frequency-selective module exceeds a threshold. The discriminating module may be further configured to provide a surge-suppressing control signal to the turbocharger when the surge condition is indicated.

While the above embodiment illustrates the use of analog electronic circuitry in the various modules of transient TCS observer 38, it will be understood that an equivalent functionality may be enacted via digital electronics and digital algorithms. For example, one or more sensor signals may be subject to analog-to-digital conversion and processed via an on-board computer in the electronic control unit. The on-board computer may be configured to enact appropriate frequency-selective and power-responsive algorithms to provide the indicated functionality.

Figure 4:
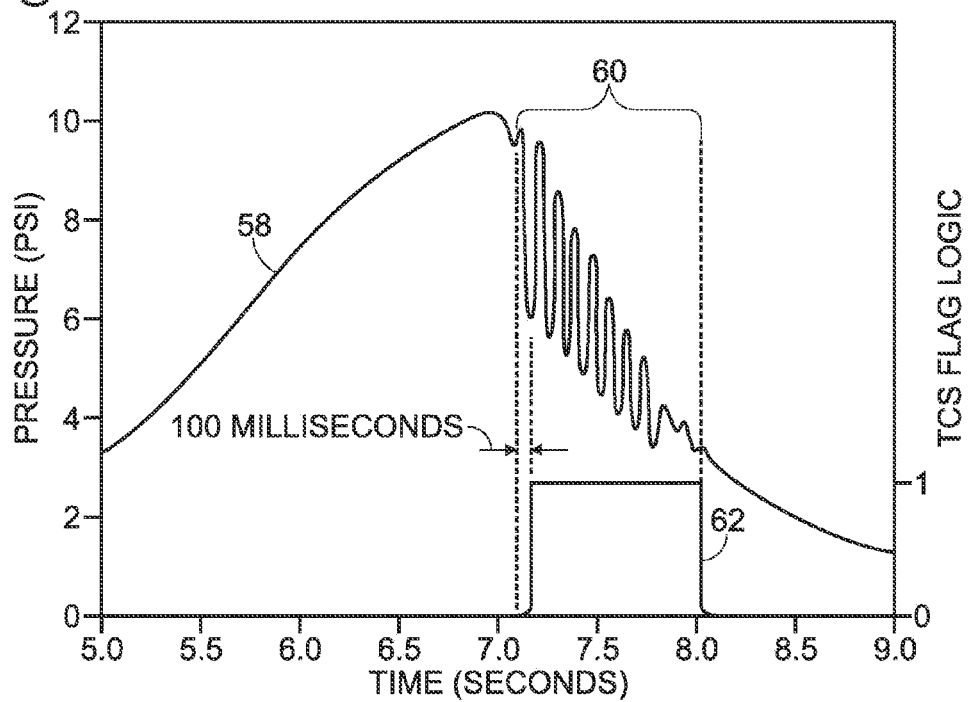
FIG. 4 shows graphs of engine intake pressure and TCS flag logic versus time for a hypothetical turbocharged engine system, in accordance with the present disclosure.

FIG. 4 shows graphs of intake pressure and TCS flag logic versus time for a hypothetical turbocharged engine system. First plot 58 of FIG. 4 is a plot of boost pressure versus time over a period that includes a transient TCS event 60. Second plot 62 is a plot of the logic state of TCS flag 42, through which electronic control unit 24 indicates TCS. In the illustrated example, the transient TCS observer is triggered approximately 100 milliseconds into TCS event 60, and indicates the event by changing the state of TCS flag 42.

FIG. 5 illustrates an example method 64 for responding to transient TCS in a turbocharged engine system. While method 64 is discussed presently with reference to the example configurations presented hereinabove, it will be understood that the method may be enacted by various other configurations as well.

Method 64 begins at 65, where an output signal of a sensor is received in an electronic control unit of a motor vehicle. In some embodiments, the output signal may be responsive to a pressure downstream of the turbocharger compressor, downstream of a charge air cooler (not shown in the drawings), and/or upstream of the intake manifold, for example. In another embodiment, the output signal may be responsive to a mass flow rate of air into the engine intake, or to a normalized mass-flow parameter. The method advances to 66, where band-pass filtering is applied to the signal. Band pass filtering may be applied via analog circuitry, as described above, or it may be applied digitally, via analog-to-digital conversion followed by Fourier filtering, for example.

Method 64 continues to 68, where the absolute value of the band-pass-filtered signal is computed. The method continues to 70, where low-pass filtering is applied to the absolute value determined at 68. Steps 68 and 70 may be enacted via appropriate analog and/or digital electronics, as described hereinabove. Taken together, steps 66-70 of the method may yield an estimate of the power of the signal received integrated over a pre-selected range of non-zero frequencies. Further, the preselected range of non-zero frequencies may be defined by the pass band applied in step 66. In other embodiments, different estimates of the power of the signal integrated over the pre-selected range of non-zero frequencies may be computed. For example, a different estimate of the power may be computed according to a modified method in which the square of the band-pass filtered signal is used instead of the absolute value.

Method 64 then continues to 72, where it is determined whether the low-pass filtered result computed at 70 exceeds a threshold. If the low-pass filtered result exceeds the threshold, then at 74, a TCS flag in a diagnostic system of the motor vehicle is set. The method then advances to 76, where a blow-off valve in the turbocharger is opened, thereby venting some of the excess pressure that would normally be provided to the intake of the engine. This is one way in which the surge condition may be suppressed. In other embodiments, one or more other operating parameters of the motor vehicle may be adjusted when a power of the signal in the pre-selected range of non-zero frequencies exceeds a pre-selected threshold. Adjusting such other operating parameters may comprise, for example, opening a waste gate in the turbocharger, decreasing a boost and/or speed of the turbocharger, momentarily opening or closing an EGR valve, or taking any other action to suppress the surge condition. In one embodiment, adjusting the one or more operating parameters may comprise at least partly closing an exhaust-gas recirculation valve when positive exhaust-gas recirculation flow is indicated, and, at least partly opening an exhaust-gas recirculation valve when negative exhaust-gas recirculation flow is indicated. Following this action, or if it is determined that the low-pass filtered result does not exceed the threshold, then the method returns.

It will be understood that method 64 or related methods may be used in conjunction with other methods applicable to steady-state TCS detection. Thus, various contemplated methods may further comprise adjusting the one or more operating parameters when an intake pressure of the engine exceeds a critical pressure based on a mass flow rate of air into the engine, or, when a mass flow rate of air into the engine is less than a critical mass flow rate based on an intake pressure of the engine, wherein one or more of the critical pressure and the critical mass flow rate are based on steady-state surge conditions of the turbocharger compressor.

It will be understood that the example control and estimation routines disclosed herein may be used with various system configurations. These routines may represent one or more different processing strategies such as event-driven, interrupt-driven, multi-tasking, multi-threading, and the like. As such, the disclosed process actions may represent code to be programmed into computer readable storage medium in an electronic control unit. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A system comprising:
    an engine with a turbocharger having a turbine and a compressor; and
    a controller having computer readable medium including instructions for responding to turbocharger surge, including recirculating exhaust from downstream of the turbine to upstream of the compressor; and opening a blow-off valve at the compressor when a power of a turbocharger condition integrated over a pre-selected range of non-zero frequencies exceeds a pre-selected threshold.

* * * * *